Patented July 2, 1940

2,206,584

UNITED STATES PATENT OFFICE 2,206,584

PROCESS FOR THE SEPARATION OF TRIMETHYLAMINE FROM MIXTURES OF TRIMETHYLAMINE AND MONOMETHYLAMINE

Le Roy U. Spence, Cheltenham, Pa., assignor to Röhm & Haas Company, Philadelphia, Pa.

Original application January 6, 1937, Serial No. 119,199. Divided and this application April 16, 1938, Serial No. 202,464

6 Claims. (Cl. 260—583)

This invention relates to a process for separating trimethylamine from its mixtures with monomethylamine and is a division of my copending application Serial No. 119,199, filed January 6, 1937.

When a mixture of methanol and ammonia is passed over a dehydrating catalyst at reacting temperatures, the reaction product is a mixture of the three amines plus water, unreacted methanol and ammonia, and some formaldehyde. The less volatile components of the mixture, water, methanol, and formaldehyde, can be easily separated from the methylamines by distillation or partial condensation. The more volatile ammonia can also be separated by distillation, but as ammonia forms a constant boiling mixture with trimethylamine, some of the latter is also removed with the ammonia. This, however, is not objectionable as the usual practice is to return the ammonia with added methanol to the reaction chamber and any trimethylamine that is mixed with it will pass through unchanged and again appear in the product.

To separate the three methylamines from one another is, however, a more difficult problem, due partially to their boiling points being very close, but more particularly to the fact that trimethylamine forms constant boiling mixtures with both monomethylamine and dimethylamine. The formation of these constant boiling mixtures makes ordinary distillation methods inapplicable to a complete separation of the mixture. Complicated methods involving a series of distillations at different pressures have been proposed. So also has a process in which sufficient ammonia is added to the mixture to remove all the trimethylamine as a constant boiling mixture. This latter process while efficient, has the disadvantage that it makes necessary the separation of the trimethylamine from the ammonia.

In an effort to develop a practical and more efficient method of separating the mixture, I made a study of the relative solubilities of the three methylamines in water and discovered the surprising fact that changes in temperature materially alter the relative solubility of the three. The results of this study are graphically shown in Figures 1 to 4 of the drawings.

Figure 5:
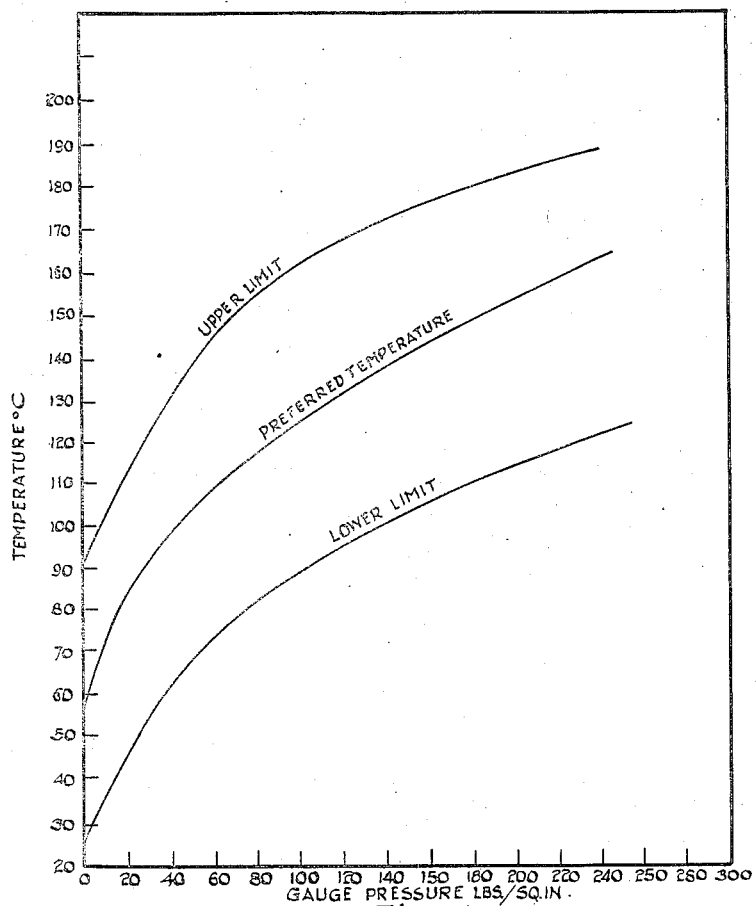

In Figure 5 the upper, lower and preferred temperatures useful in the process herein disclosed are graphically illustrated.

Figure 1:
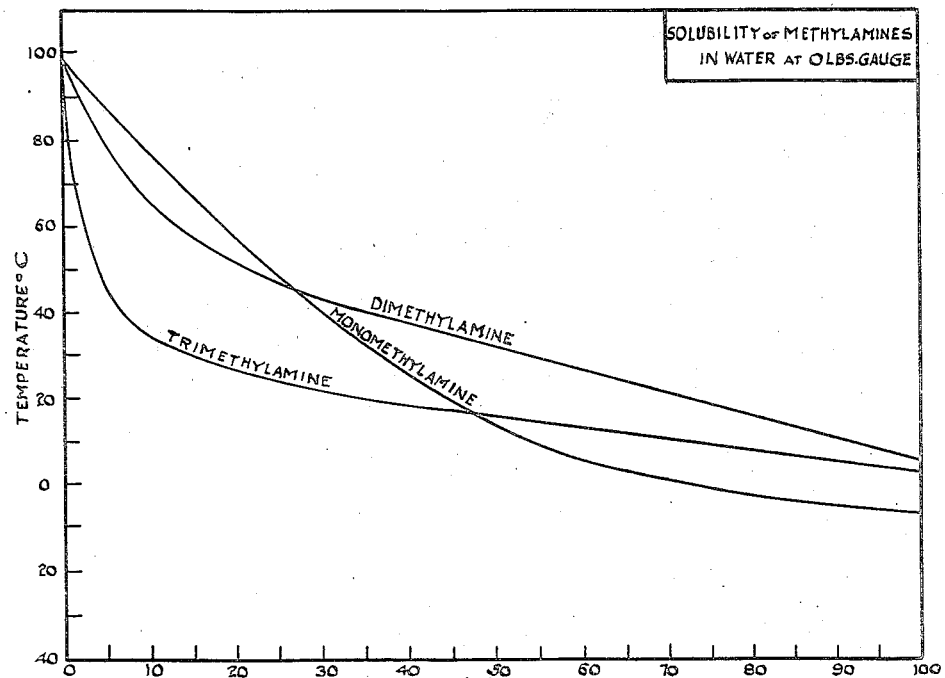
Figure 1 is a graph showing the effect of temperature on the solubility of the three methylamines at zero gauge pressure.

An inspection of Figure 1 shows that at zero pounds gauge as the temperature is increased, the solubility of trimethylamine in water diminishes much more rapidly than does the solubility of either monomethylamine or dimethylamine. At temperatures below about 18° C. trimethylamine is more soluble than monomethylamine. At 18° their solubility curves cross and on further increase in temperature the solubility of trimethylamine becomes much less than that of monomethylamine. At about 20° C. the solubility of trimethylamine is roughly eight-ninths that of monomethylamine and one-half that of dimethylamine. At 40° C. the solubility of trimethylamine falls to about one-fifth that of monomethylamine and one-sixth that of dimethylamine. At still higher temperatures, for instance, at 70° the solubility of trimethylamine is only one-eighth that of monomethylamine and less than one-fifth that of dimethylamine. In connection with this graph, it is interesting to observe how the monomethylamine curve crosses both the dimethylamine curve and the trimethylamine curve.

Figure 2:
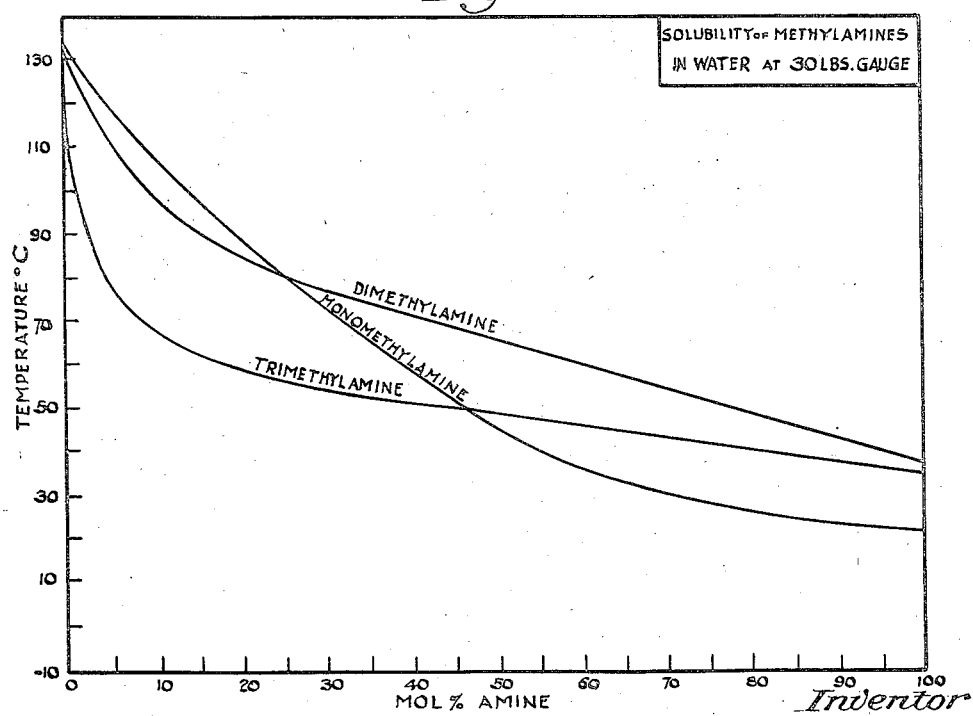
Figure 2 shows the same relationship at a pressure of 30 pounds gauge.
Figure 3:
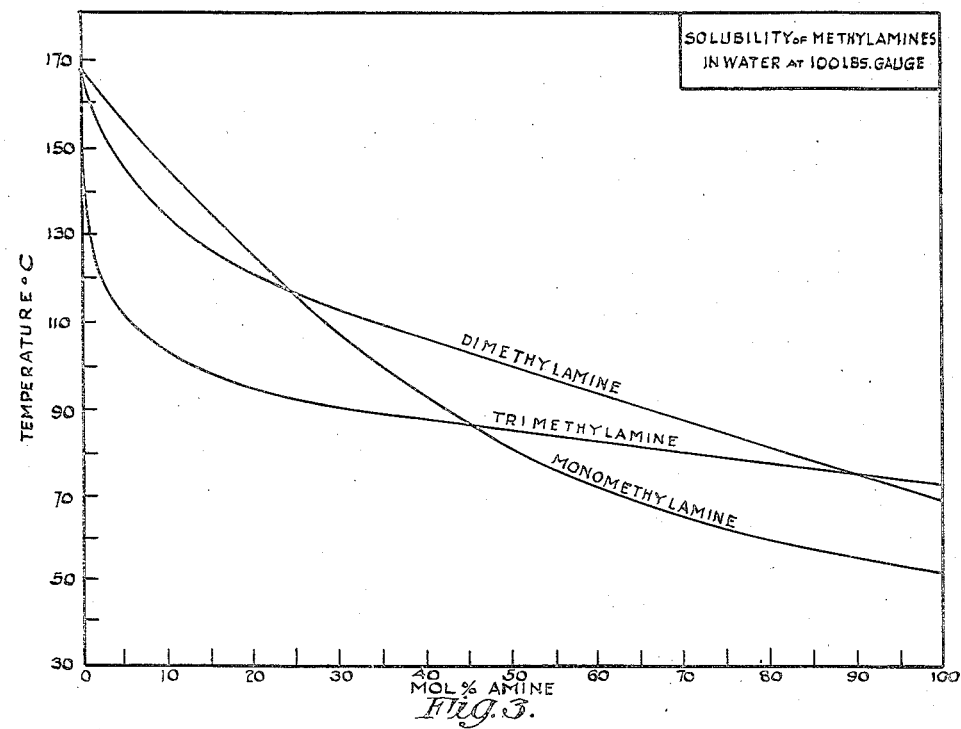
Figure 3 shows it at 100 pounds gauge.
Figure 4:
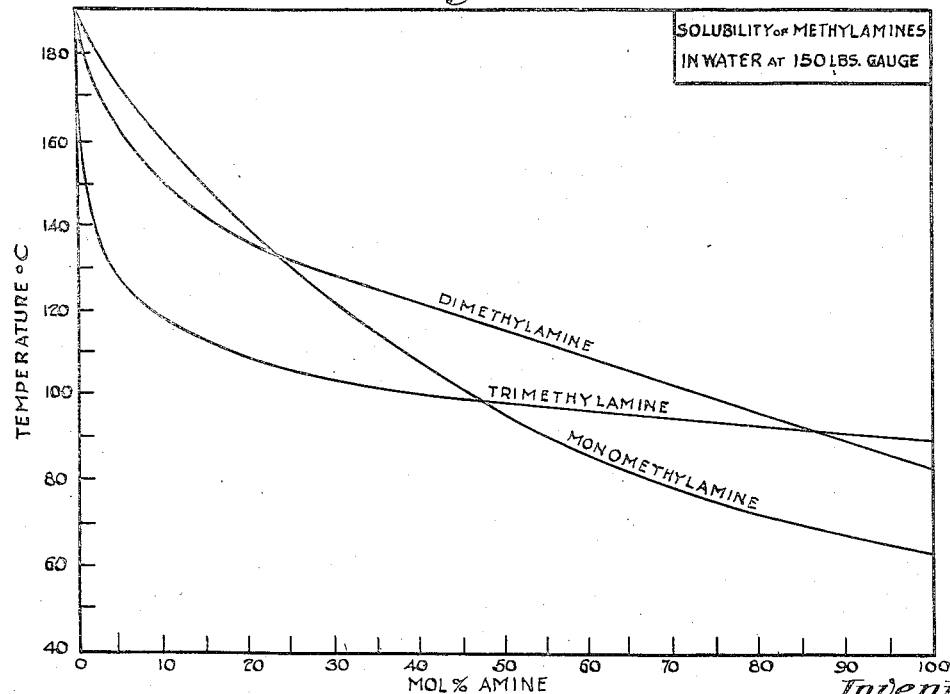
Figure 4 shows it at 150 pounds gauge.

Reference to Figures 2, 3, and 4 shows that changes in pressure do not materially change the general contour of the three curves, but only move them along the temperature axis.

It will also be observed from Figure 1 that at zero pounds gauge there is a wide difference in relative solubility of the three amines at temperatures ranging from 25° C. to about 90° C. At temperatures below 25° C. the solubility of trimethylamine approaches that of monomethylamine very rapidly and at temperatures above 90° C. the solubilities of all the amines rapidly fall to zero. In Figure 2 a comparative temperature range extends from about 55° C. to 123° C. In Figure 3 the range is from 90° C. to about 157° C., and in Figure 4 from 105° C. to 175° C. In each instance there is a temperature range extending over 65 to 70 centigrade degrees, throughout which there is a wide difference in the solubilities of trimethylamine and monomethylamine or dimethylamine. That temperature range in each instance extends from 10 to 75–80 degrees centigrade beneath the boiling point of water at the given pressure.

In the present invention this great difference in solubility within the stated temperature range is utilized to separate the trimethylamine from monomethylamine and dimethylamine. In general it consists in bringing a mixture of the three methylamines in contact with a quantity of water insufficient to dissolve them completely, and controlling the temperature so that it is within the range where the difference in their solubilities makes possible a separation of the trimethylamine. When a mixture of gases is brought in contact with a quantity of liquid insufficient to dissolve them completely, they go into solution in proportion to their concentration in the mixture and to their solubilities. The gases in solution will therefore contain a greater proportion of the more soluble component than did the original mixture, and the undissolved gases will be proportionately more concentrated in the less soluble component. In the following example this principle is illustrated when applied to a mixture of methylamines at a temperature where trimethylamine is much less soluble than dimethylamine or monomethylamine.

*Example 1.*—A mixture of amines containing 59.5% monomethylamine, 28% dimethylamine, 12.3% trimethylamine, and 0.2% ammonia, was withdrawn from a cylinder and passed into water held at 79° C. and atmospheric pressure. The composition of the amines in solution was determined and found to be 72.6% monomethylamine, 23.4% dimethylamine, and 3.9% trimethylamine. The process therefore reduced the trimethylamine content of the original mixture from 12.3% to 3.9%.

By stripping the solution of the dissolved amines and repeating the absorption on both undissolved and stripped gases, a substantially complete separation of the trimethylamine from monomethylamine and dimethylamine can be effected. In practice, the repeated absorption and stripping is preferably carried out in a packed column or bubble cap column or similar device into which water is fed at the top and amines at an intermediate level. Heat applied at the bottom of the column strips the water of the small amount of trimethylamine that reaches it. As the gaseous amines rise in the column they are absorbed in proportion to their concentration and relative solubility. The mixture thereby becomes gradually richer in trimethylamine as it ascends the column and is substantially pure when it leaves the top. The liquid with its absorbed amines, as it descends the column, contacts gas in which the concentration of trimethylamine is below the equilibrium point, whereupon it gives up the dissolved trimethylamine.

In the operation of such a column to separate methylamines by the present invention, the temperatures at the top and bottom should be preferably from 10 to 60 centigrade degrees apart, but both within the range of from 10 to 75–80 degrees centigrade below the boiling point of water at the pressure used. The rate at which the mixture is fed to the column will depend upon its size and capacity and be below the rate at which flooding or entrainment will occur. The rate at which undissolved amines are taken off at the top of the column is adjusted in accordance with the input rate and should preferably approximate that fraction of the input equal to the fraction of trimethylamine in the feed. The undissolved amines are preferably passed through a partial condenser, the function of which is to condense and return to the column the water vapor carried off with the amines. The temperature at the top of the column is controlled by the temperature of the water fed in at this point and by the reflux from the partial condenser. The temperature of the pot is held constant by regulating the heat supplied to it. The pressure in the apparatus is controlled by adjusting the water input. If too much water is used the pressure in the column will be reduced by reason of an excessive amount of amines being dissolved. Insufficient water will increase the pressure through its inability to absorb the proper quantity of amines.

In the following examples, given to illustrate the process, a column two inches in diameter, twenty feet long, packed with ½″ x ½″ stoneware rings, was used. The column was made in two sections, the lower one being seven feet and the upper one thirteen feet long. The mixture of amines was introduced at the top of the seven-foot section. Water was fed into the top of the column at a regulated temperature. The water saturated with amines was collected in a pot at the bottom of the column. The undissolved amines were removed from the top of the column through a partial condenser and passed to a receiver.

*Example 2.*—The amine mixture used contained 55.5% monomethylamine, 26.2% dimethylamine, 14.0% trimethylamine and 4.3% water and methanol. This was fed into the column at a rate of 24.9 lbs. per hour. The temperature in the pot was held at 105° C. and the rate of water feed at the top of the column was adjusted to hold the pressure in the unit at 50 pounds gauge. The temperature of the water fed into the top of the column was held at 83° C. Amines were taken off at a rate of 2.0 pounds per hour through the partial condenser. The cooling of the partial condenser was adjusted to keep the top of column temperature at 85° C. The amines taken off were 94.6% pure trimethylamine. The amines collected in the pot (in solution in water) contained only 7.3% trimethylamine as compared with the original 14.6% trimethylamine (on the anhydrous basis).

*Example 3.*—A mixture of amines containing 51.6% monomethylamines, 32.3% dimethylamine, and 12.1% trimethylamine, and 4.0% water and methanol was used. This was fed into the column at a rate of 22.8 pounds per hour. The temperature in the pot was held at 134° C. and the water feed was regulated to hold the pressure at 100 pounds gauge. The temperature of the water fed in was 99° C. Amines were taken off the top of the column at a rate of 2.13 pounds per hour. The cooling on the partial condenser was adjusted to hold the top of column temperature at 102° C. The amines taken off were 97.5% pure trimethylamine, and the trimethylamine removed was 75% of the total trimethylamine put in. The amines collected in the pot contained only 3.5% trimethylamine as compared with 12.6% in the feed (anhydrous basis).

*Example 4.*—The mixture of amines used contained 57.2% monomethylamine, 28.7% dimethylamine, 12.6% trimethylamine and 1.5% water and methanol. This was fed into the column at a rate of 24.3 pounds per hour. The temperature of the pot was held at 144° C. and the water feed was regulated to hold the pressure at 150 pounds. The temperature of the water feed was 108° C. Amines were taken off at a rate of 2.97 pounds per hour. The cooling on the partial condenser was regulated to hold the top of column temperature at 112° C. The amines taken off were 97.2% pure trimethylamine, and the trimethylamine removed was 94% of the total trimethylamine put in. The amines collected in the pot contained only 0.9% trimethylamine as compared with 12.8% in the feed (anhydrous).

It is evident that by selecting the proper opeating temperatures the process may be carried out at any desired pressure. Preferably the pressure should be high enough so that the trimethylamine coming from the top of the column can be condensed with ordinary cooling water. At pressures above 40 pounds gauge this can readily be done. If for any reason it is desirable to operate below 40 pounds, the trimethylamine can be absorbed in water and recovered as a solution or condensed by refrigeration. In using the process in conjunction with a plant for producing three methylamines, the higher pressure would be most useful. In such a plant the still used for recovering and returning unreacted ammonia to the reaction chamber is ordinarily operated at a pressure of from 200 to 250 pounds gauge, so that ordinary cooling water can be used to condense the ammonia. The mixture of methylamines obtained as bottoms from that still could then be transferred through a pipe line to a unit for separating the trimethylamine in accordance with the present invention, operating at 150 to 175 pounds pressure. At that pressure the trimethylamine coming from the top of the column could readily be condensed by ordinary cooling water and the solution of dimethylamine and monomethylamine obtained as bottoms could be allowed to flow to a stripping column operating at 125 to 150 pounds pressure. The anhydrous amines from the stripping column could then be led into a fractionating column operating at 100 pounds pressure where the monomethylamine and dimethylamine could be separated. Thus, by operating the various units in the system at gradually reduced pressures, pumping the amines from one unit to another is avoided. Also, by using pressures of the order of those indicated, ordinary cooling water can be used to condense the various fractions, thereby avoiding the need of refrigeration.

I have herein given a detailed description of my process as it is applied to the separation of trimethylamine from its mixtures with both monomethylamine and dimethylamine. It is, however, also applicable, if the proper temperature is selected, to two-component mixtures of trimethylamine and dimethylamine, of trimethylamine and monomethylamine, and even of dimethylamine and monomethylamine. For the separation of a mixture of trimethylamine and either dimethylamine or monomethylamine, the operative temperature range is substantially that of the three-component mixture, i. e., from 10 to 75-80 degrees centigrade beneath the boiling point of water at the pressure employed, although with dimethylamine the minimum temperature may be slightly below this range. For the separation of dimethylamine and monomethylamine, two choices of temperature ranges are available. I have shown in the solubility curves that the curves for mono and di cross each other. This point is approximately 50° C. below the boiling point of water. By operating in the range between this point and the boiling point of water, we can separate dimethylamine as the least soluble gas. By operating in the range between this point and the boiling point of dimethylamine, I can separate monomethylamine as the last soluble gas.

I claim:

1. The process of separating trimethylamine from a mixture of trimethylamine and monomethylamine which comprises passing the mixture into a column at an intermediate point thereof, passing water down the column in quantities sufficient to dissolve substantially all the monomethylamine but insufficient to dissolve the whole mixture, and adjusting the temperature throughout said column so that it is within the range from 10 to 75 degrees centigrade below the boiling point of water at the pressure used.

2. The process of separating trimethylamine from a mixture of trimethylamine and monomethylamine which comprises passing the mixture into a column operating under a pressure above 40 pounds gauge at an intermediate point thereof, passing water down the column in quantities sufficient to dissolve substantially all the monomethylamine but insufficient to dissolve the whole mixture, and adjusting the temperature throughout said column so that it is within the range from 10 to 75 degrees centigrade below the boiling point of water at the pressure used.

3. The process of separating trimethylamine from a mixture of trimethylamine and monomethylamine which comprises selectively absorbing the monomethylamine in water by passing the mixture in contact with a stream of water flowing countercurrent thereto at a temperature of from 10 to 75 degrees centigrade below the boiling point of water at the pressure employed.

4. The process of separating trimethylamine from a mixture of trimethylamine and monomethylamine which comprises selectively absorbing the monomethylamine in water by passing the mixture in contact with a stream of water flowing countercurrent thereto under a pressure of over 40 pounds gauge and at a temperature of from 10 to 75 degrees centigrade below the boiling point of water at the pressure employed.

5. The process of separating trimethylamine from a mixture of trimethylamine and monomethylamine which comprises selectively absorbing the monomethylamine in water at a temperature of from 10 to 75 degrees centigrade below the boiling point of water at the pressure employed.

6. The process of separating trimethylamine from a mixture of trimethylamine and monomethylamine which comprises selectively absorbing the monomethylamine in water under a pressure of over 40 pounds gauge and at a temperature of from 10 to 75 degrees centigrade below the boiling point of water at the pressure employed.

LE ROY U. SPENCE.